United States Patent [19]
Cioffi et al.

[11] Patent Number: 5,205,889
[45] Date of Patent: Apr. 27, 1993

[54] METHOD AND APPARATUS FOR PRODUCING FLEXIBLE TUBES OF ANY LENGTH

[75] Inventors: Giuseppe Cioffi, Castel di Lama; Guido Albertini, Roccafluvione; Stefano Barbieri, Rome, all of Italy

[73] Assignee: Manuli Rubber Industries S.r.l., Ascoli Piceno, Italy

[21] Appl. No.: 654,603

[22] PCT Filed: Aug. 2, 1989

[86] PCT No.: PCT/EP89/00908

§ 371 Date: Apr. 11, 1991

§ 102(e) Date: Apr. 11, 1991

[87] PCT Pub. No.: WO90/01407

PCT Pub. Date: Feb. 22, 1990

[30] Foreign Application Priority Data

Aug. 10, 1988 [IT] Italy ................. 67755 A/88

[51] Int. Cl.[5] .................. B29C 53/70; B29D 23/22
[52] U.S. Cl. .................... 156/158; 156/188; 156/190; 156/195; 156/304.2; 156/304.3; 156/381; 156/428; 156/503; 425/392
[58] Field of Search .............. 156/158, 188, 190, 195, 156/304.2, 304.3, 304.6, 381, 382, 428, 430, 431, 432, 503; 425/387.1, 392

[56] References Cited

U.S. PATENT DOCUMENTS

| | | | |
|---|---|---|---|
| 1,129,084 | 2/1915 | Gammeter | 156/156 |
| 2,023,665 | 12/1935 | Clayton | 425/387.1 |
| 2,307,575 | 1/1943 | Davis | 425/392 |
| 2,930,406 | 3/1960 | Galloway | 156/158 |
| 3,083,130 | 3/1963 | Strandquist | 156/184 |
| 3,100,659 | 8/1963 | Rittenhouse | 156/304.2 |
| 3,128,216 | 4/1964 | Reed | 156/195 |
| 3,240,645 | 3/1966 | Friedwald et al. | 156/195 |
| 3,296,051 | 1/1967 | Harpfer et al. | 156/432 |
| 3,616,008 | 10/1971 | Stump | 156/190 |
| 4,309,232 | 1/1982 | McIntosh et al. | 156/195 |
| 4,416,721 | 11/1983 | Deregibus | 156/195 |

FOREIGN PATENT DOCUMENTS 2006351  5/1979  United Kingdom ............... 425/392

Primary Examiner—Michael W. Ball
Assistant Examiner—Steven D. Maki
Attorney, Agent, or Firm—Sughrue, Mion, Zinn, Macpeak & Seas

[57] ABSTRACT

A method and apparatus for producing flexible tubes of desired length from several strips of rubber and/or fiber reinforced rubber. The apparatus comprises a wrapping machine and a vulcanizer arranged in series on a common axis along which a core can move.

8 Claims, 8 Drawing Sheets

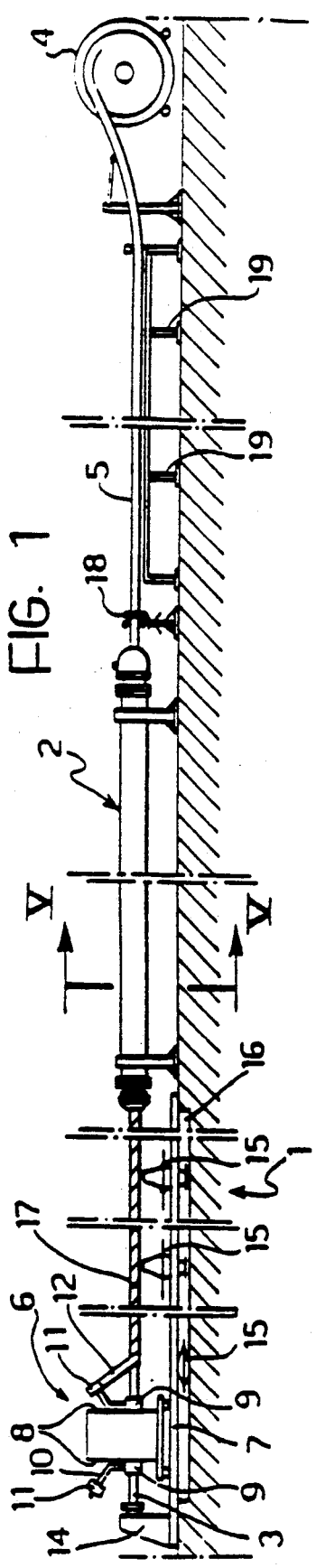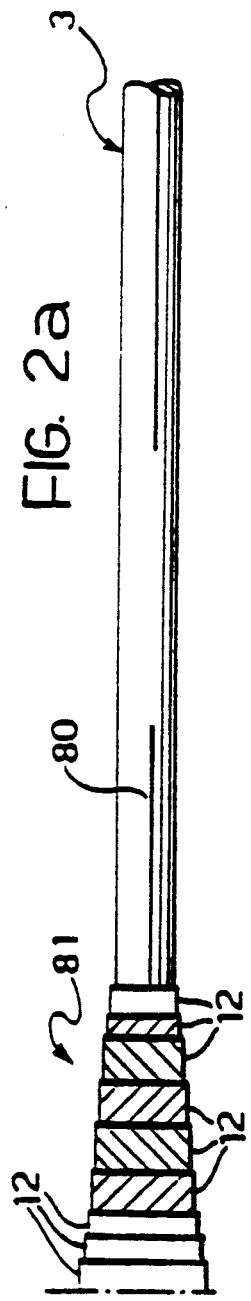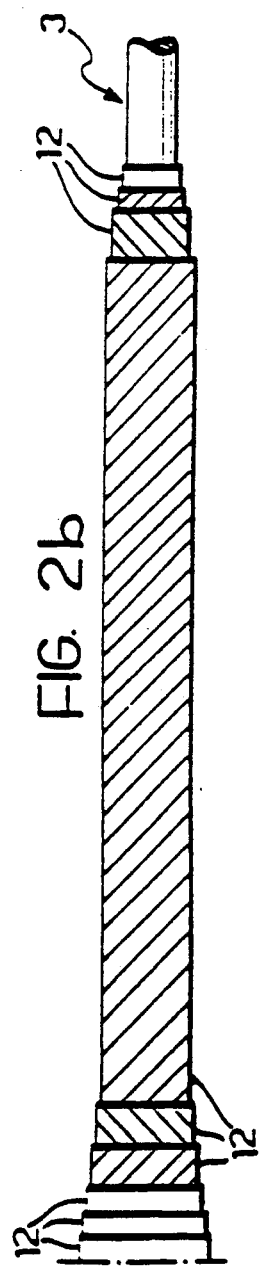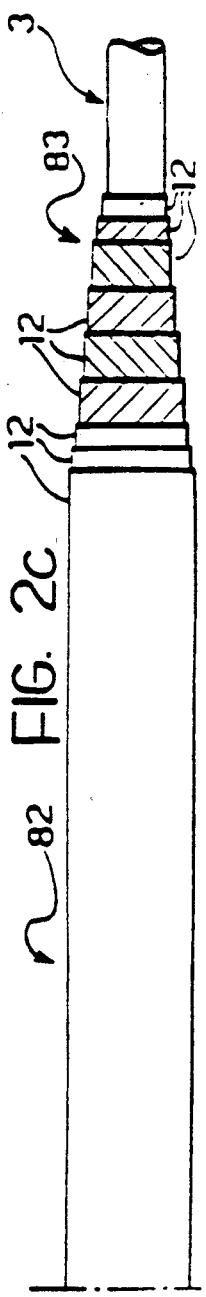

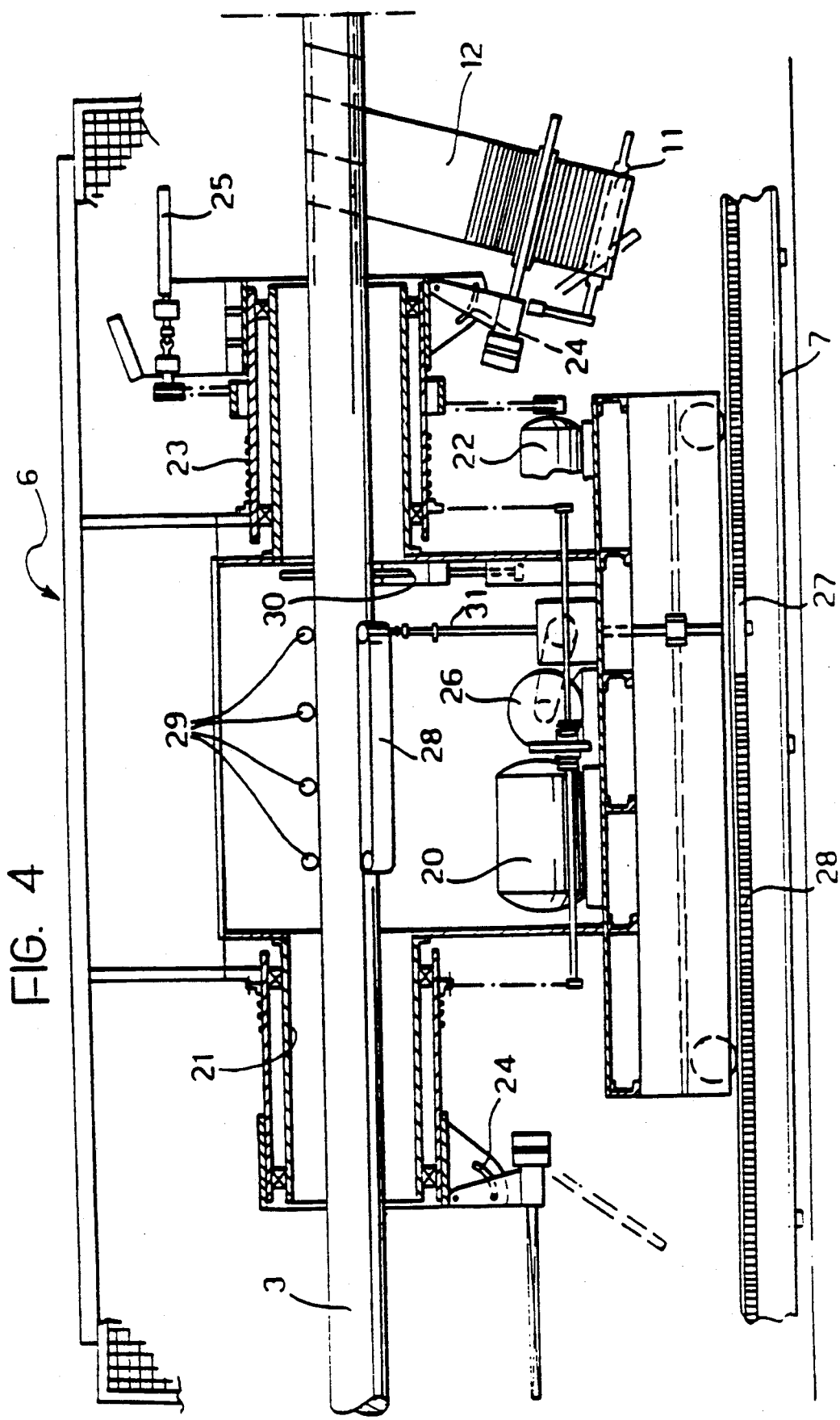

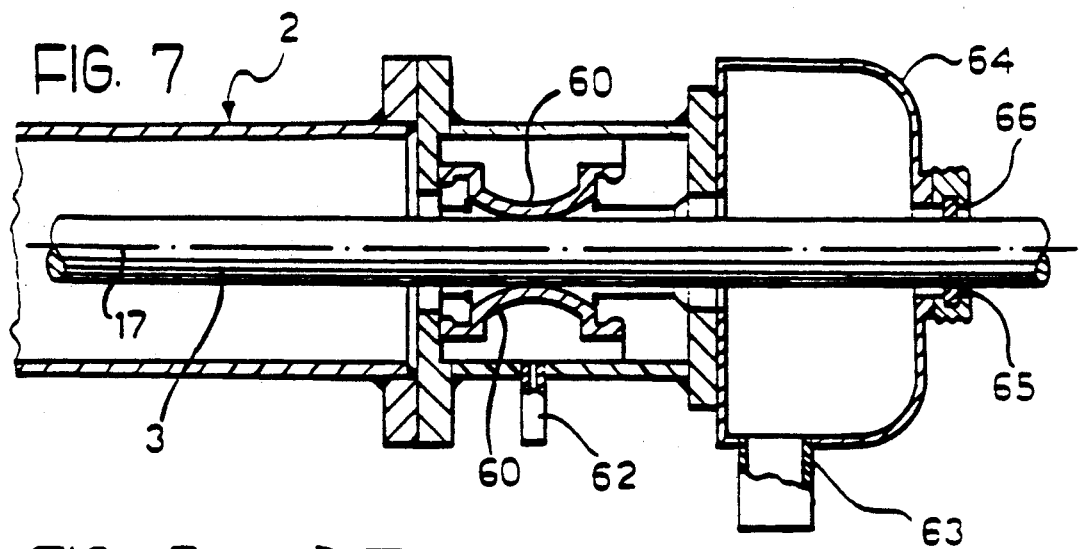
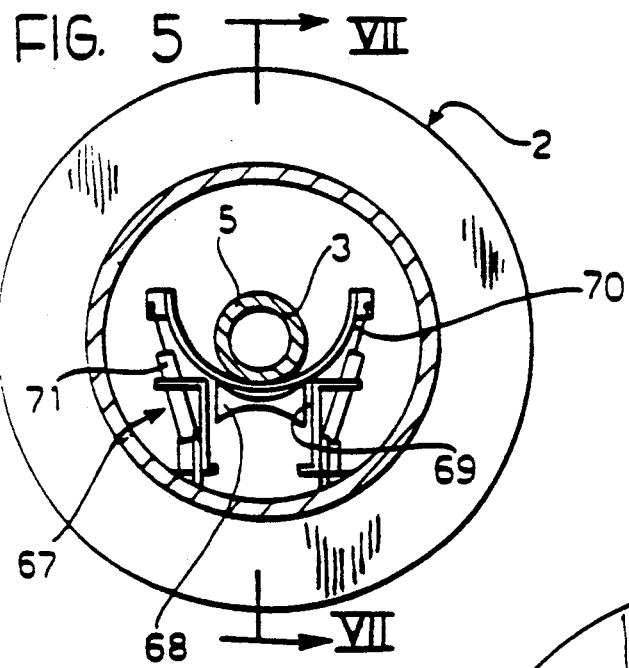
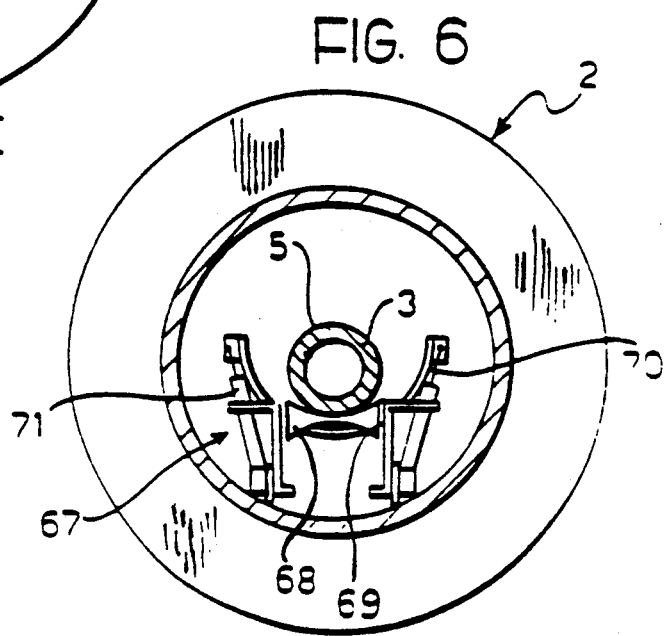

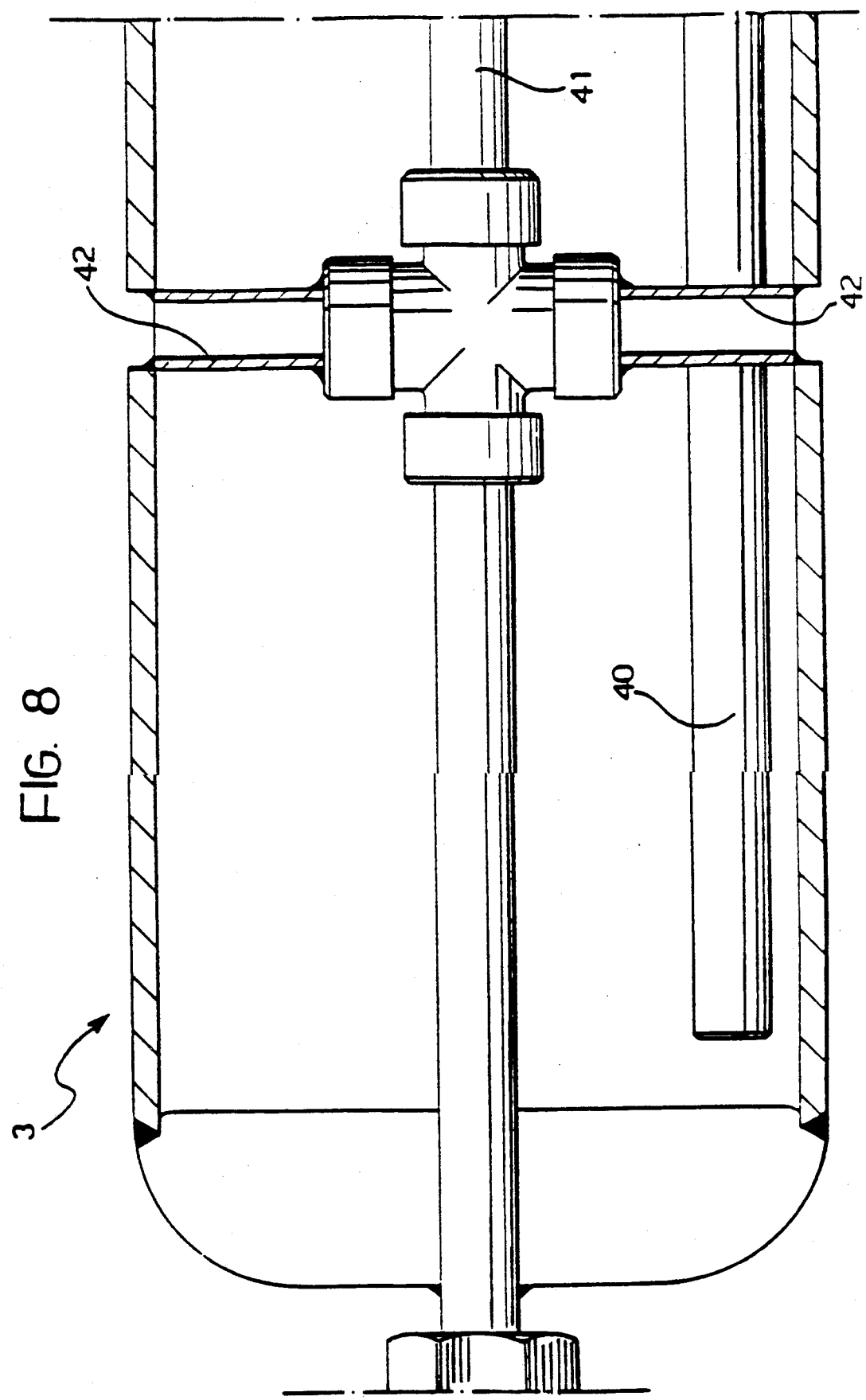

METHOD AND APPARATUS FOR PRODUCING FLEXIBLE TUBES OF ANY LENGTH

BACKGROUND OF THE INVENTION

The present invention relates to a method for producing flexible tubes and to an apparatus therefor.

GB-A-906 810 discloses an apparatus for the production of flexible tubes comprising a wrapping machine for depositing strips of rubber around an elongate hollow cylindrical core and a vulcanizer, which are arranged in series on a common axis. The wrapping machine includes a trolley, which is provided with a motor for its movement on rails and has a through hole for the passage of the core in correspondence with the common axis, and a plurality of heads which rotate about the axis and carry reels bearing the strips to be deposited.

The vulcanizer has holes in its ends in correspondence with the common axis and contains an air bag, which is fed with compressed air by a duct surrounded by the hollow core.

In the operation, a portion of flexible tube is built over the core kept out from the vulcanizer, superposing therein several strips of rubber or reinforced rubber. Then the core is retracted, the deflated air bag is inserted into the portion of green tube just built and the previously vulcanized portion of tube is pulled out from the vulcanizer, pulling the green portion of the tube into the vulcanizer through tension, transmitted by a liner which adheres externally to both tube portions. The green portion is then vulcanized around the inflated air bag and this cycle of operations is repeated until the tube becomes as long as desired.

According to GB-906 810, the green portion of the tube has to be initially supported by the core during the wrapping operation and then by the air bag during the vulcanization operation. The transfer from the first to the second supporting means constitutes a delicate step, where the easily deformable still uncured portion of the tube may be permanently damaged due to applied stresses.

SUMMARY OF THE INVENTION

In order to overcome the above-mentioned drawback of the prior art, the present invention provides a method for the production of flexible tubes of rubber and/or fiber-reinforced rubber comprising the steps of:

filling an unvulcanized end of a previously wrapped first section of a tube onto a lateral surface of an end portion of an elongate cylindrical core, leaving the remaining portion of the lateral surface of the core uncovered;

covering the remaining portion of the core with a plurality of superposed strips of rubber so as to form, as an extension of the first section, a second section of tube having a first end adjacent the first section, an intermediate portion and a second end opposite the first end;

inserting into a vulcanizer a portion of the core covered by the unvulcanized end of the first section, the first end and the intermediate portion of the second section, leaving outside the vulcanizer a portion of the core covered by the second end of the second section;

vulcanizing the unvulcanized end of the first section, the first end and the intermediate portion of the second section inserted in the vulcanizer so as to join the first and second sections and to form a vulcanized portion of tube;

separating the vulcanized portion of tube from the core by blowing air into the core, so that air passes through holes formed in the surface of the core and works its way between the outer surface of the core and the tube to separate them;

expelling the core from the vulcanizer until the second end of the second section of tube is fitted onto the lateral surface of the end portion of the core, with the vulcanized portion of the tube remaining inside the vulcanizer; and repeating the above steps until the tube has reached the desired length, using as the first section of tube at any time the entire portion of tube produced up to that time.

A further object of the present invention is the provision of an apparatus for performing the above described method comprising a wrapping machine for depositing strips of rubber around an elongate cylindrical core, and a vulcanizer which are arranged in series on a common axis.

The wrapping machine comprises a trolley, provided with a motor for its movement and having a through hole for the passage of the core in correspondence with the common axis and at least one head carrying a reel bearing the strips to be deposited.

The vulcanizer has, in correspondence with the common axis, holes in its ends and in their proximity means for sealing against the core covered by the strips which is introduced into the vulcanizer.

The core has at least a through hole formed in its surface and connected to air blowing means and can be propelled by the trolley into the vulcanizer.

BRIEF DESCRIPTION OF THE DRAWINGS

Advantages and characteristics of the present invention will become clear from the detailed description which follows with reference to the appended drawings, provided by way of non-limiting example, in which:

FIG. 1 is a diagrammatic view of an apparatus for carrying out a method according to the invention.

FIGS. 2a, 2b and 2c show a method for superposing the various strips of rubber constituting a section of tube on a core, FIG. 4 is a side view of the trolley of FIG. 3, FIG. 5 is a section of the vulcanizer taken on the line V—V of FIG. 1, FIG. 6 is a section of the vulcanizer at another stage of operation, taken on the line V—V of FIG. 1.

FIG. 7 is a section of a detail of the vulcanizer of FIG. 1 taken on the line VII—VII of FIG. 5.

FIG. 8 is a section of a detail of the core of FIG. 1.

DETAILED DESCRIPTION OF THE INVENTION

Figure 3:
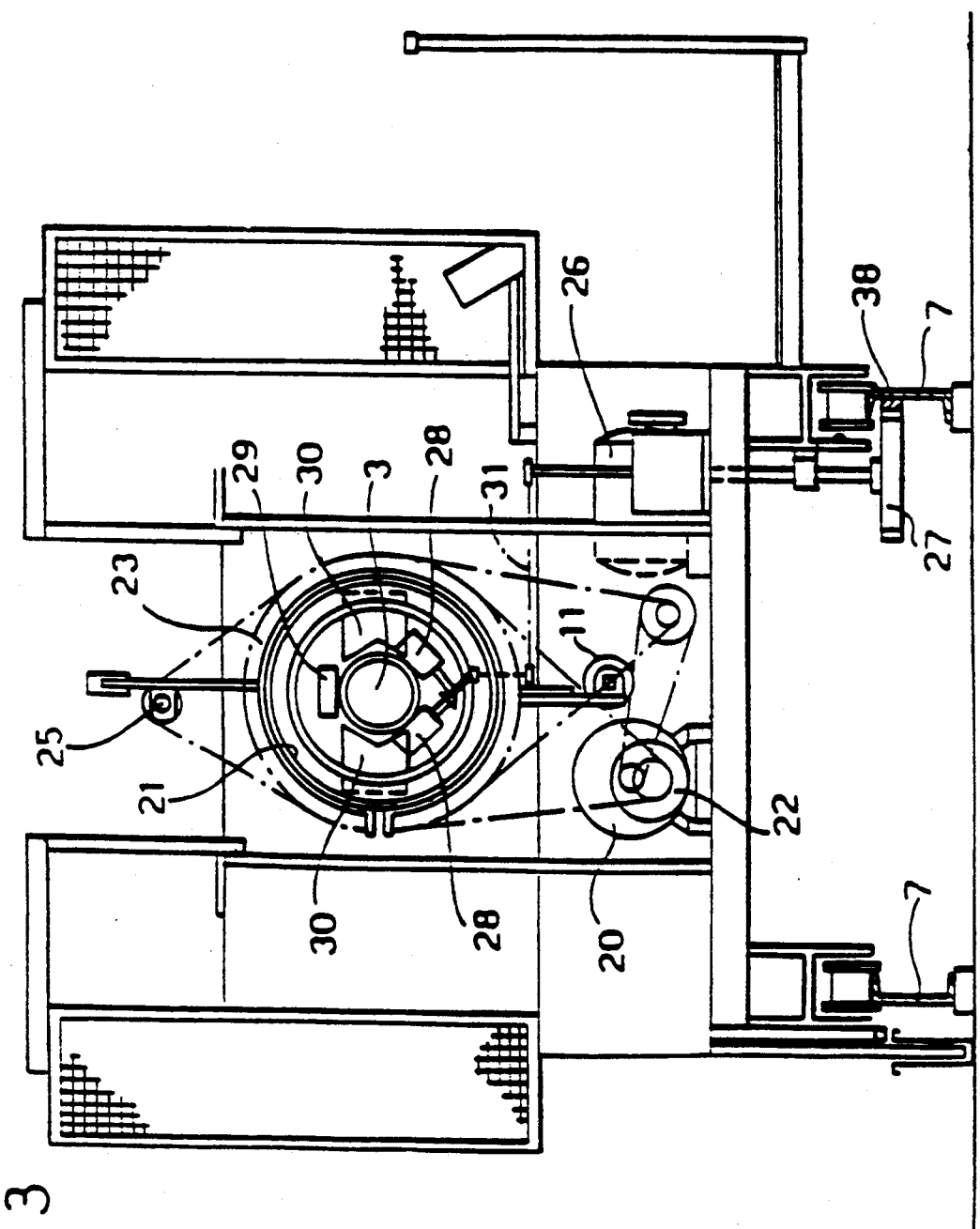
FIG. 3 is a diagrammatic front view of the trolley of the apparatus of FIG. 1 with parts removed.

An apparatus for producing flexible tubes of any length from several superposed strips 12 (FIG. 2) of rubber and/or fiber-reinforced rubber comprises (FIG. 1) a wrapping machine 1, a vulcanizer 2, a core 3 which moves between these two pieces of equipment, and a reel 4 for collecting the finished tube 5.

The wrapping machine 1 includes a trolley 6 which moves on rails 7 and carries on each of its two faces 8 a head 9 which, by virtue of a motor 20 (FIGS. 3 and 4), rotates about a hole 21 through the trolley for the passage of the core 3. Each head 9 carries an arm 10 with a regulator 24 for adjusting its angle of inclination to the core 3, and the arm supports a reel 11 on which the strips 12 to be deposited around the core 3 are wound in succession.

A motor 22 enables a bush 23 to rotate independently around each head 9 and, by means of the arm 25, the bush is able to carry a reel, not shown, from which a bandage can unwind to surround the already-deposited strips and compact them.

The trolley 6 can move in two directions by virtue of a motor 26 which drives a pinion 27 that engages a rack 38 carried by the rails 7.

There are two belts 28 within the trolley 6 for supporting the core 3, and these are driven by the motor 26 through a kinematic mechanism 31, so that their velocity is equal to and opposite that of the trolley 6, thus preventing slippage between the core 3 and the belt 28. Idle rollers 29 are arranged in succession above the core 3. The rollers 29 and the belts 28 together prevent the misalignment of the core 3 relative to the hole 21 as a result of the radial forces exerted by the strips 12 during the deposition stage which will be described below.

The trolley 6 also houses a clamp 30 which can be clamped onto a reduced-diameter portion of the core 3 to make it fast with the trolley 6 and enable it to be propelled thereby.

The elongate cylindrical core 6 is hollow (FIG. 8) and within it are a small tube 40 for the passage of cooling air and a small tube 41 which communicates with the outer surface of the core 3 by means of holes 42 through which air can pass to separate the vulcanized tube 5 from the core 3. Moreover, in correspondence with its end opposite that which faces the vulcanizer, the core has a reduced-diameter portion, not visible in the drawings. This portion can be engaged by the clamp 30 carried by the trolley 6 during the movement stages, and by a fixed clamp 14 located at one end of the rails 7 when the core is stationary, to prevent it from rotating about its own axis. When the core 3 is in correspondence with the wrapping machine 1 (as shown in FIG. 1), it is supported by support means 54 mounted on pantographs 15 located in a trench 16 formed beneath the path of the trolley 6, the means 54 being movable between a withdrawn position in which they do not interfere with the movement of the trolley 6 and an extended position for supporting the core 3.

Figure 9:
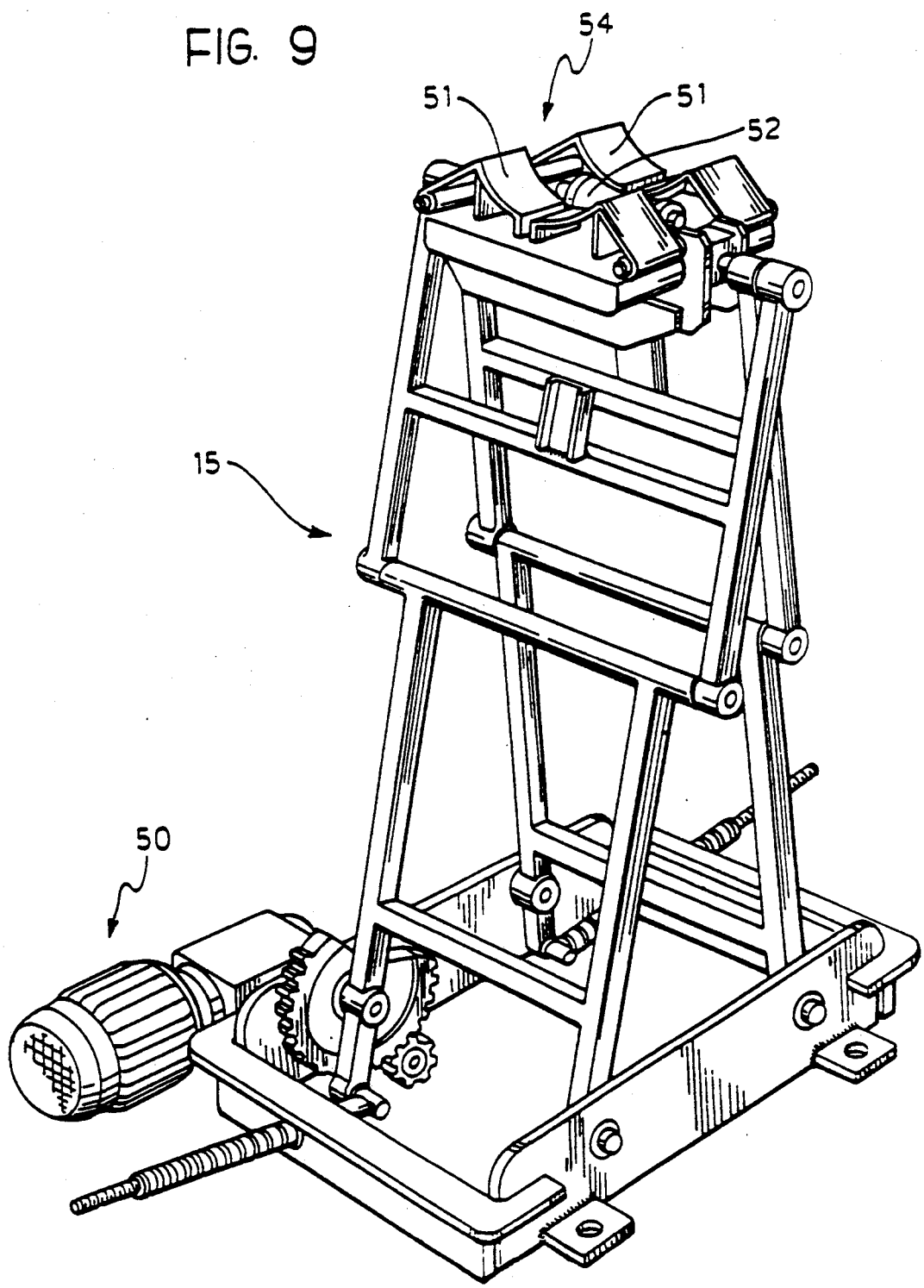
FIG. 9 is a perspective view of one of the pantographs of FIG. 1.

Each pantograph 15 is driven by a motor 50 which lowers it in correspondence with the approach of the trolley 6. Each pantograph 15 (FIG. 9) carries the support means 54 for the core 3, which include supports 51 and a roller 52 which is rotatable about an axis perpendicular to the core and movable in a plane perpendicular thereto. The supports 51 support the core 3, covered by the strips 12, when it is stationary, without damaging the still-raw rubber of the strips 12 by virtue of the large surface area of contact which they provide. The rollers 52 are raised when the core 3 starts to move, supporting it and rotating about their own axes without harmful mutual slippage.

The vulcanizer 3 is arranged in series with the wrapping machine 1 and defines therewith a common axis 17 along which the core 3 can move, as will be described below.

The vulcanizer 2 (FIG. 7) has holes in both its ends 66, in correspondence with the common axis 17, and sealing means constituted by inflatable toroidal sleeves 60 are provided near the ends. Once inflated through a tube 62, these can come into contact with a circumferential surface of the outermost of the strips 12 covering the core 2, ensuring the sealing of the vulcanizer 2. In the event of the breakage of a sleeve 60, most of the vapor can be discharged through an aperture 63 formed in a safety chamber 64, since a rigid rubber sealing ring 65 ensures a separate, though obviously not perfect, seal in correspondence with the holes in the ends 66 of the vulcanizer 2.

Means 67 for supporting the core 3 are located within the vulcanizer 2 (FIGS. 5 and 6). Each of these comprises a roller 68, which is rotatable about an axis 69 perpendicular to the core 3, and a support 70 which is movable in a plane perpendicular to the core 3. The supports 70 support the core 3, covered by the strips 12, when it is stationary, without damaging the rubber of the strip 12, which at certain stages is still raw, by virtue of the large surface area of contact they afford. When the core 3 starts to move, however, the supports 70 are lowered under the action of oleodynamic cylinders 71 and the core 3 is supported by the rollers 68 which rotate on their own axes without harmful mutual slippage.

Supports 19 for the vulcanized tube 5, which is collected on a reel 4, are located at the outlet of the vulcanizer (FIG. 1), at the opposite end from the wrapping machine 1. Upstream of the reel is a constriction device 18 which can close the vulcanized tube 5 by squeezing its outer surfaces.

A method of producing flexible tubes with the use of the apparatus described above will now be described.

The core 3 (FIG. 1) is located in the wrapping machine and is secured by the clamp 14 outside the vulcanizer 2. A raw end 81 of a first section 5 of already-vulcanized tube which extends through the vulcanizer 2 and is wound around the reel 4 is fitted onto its end portion 80 (FIG. 2).

The trolley 6 then moves in two directions along the rails 7 and, with its rotary heads 9, deposits the various strips 12 around the core 3 with their ends directly superposed on respective, corresponding stepped strips of the end 81 of the first section 5, forming a second section 82 which extends the first section 5. In order to prevent any damage to the strips 12 by the members of the trolley 6, it is convenient for them to be deposited by the head 9 which, at that moment, is situated at the rear with respect to the direction of movement of the trolley 6. Finally, by means of a further pass of the trolley 6, a bandage carried by the reel which rotates with the bush 23 is unwound to bind the assembled section of tube 82 in order to compact it and assist its subsequent vulcanization.

The trolley 6 then clamps the core 3 with the clamp 30 and pushes it into the vulcanizer 2, the end portion 83 of the section 82 opposite that adjacent the first section 5 being left outside.

During this stage, as during all subsequent stages of movement, the reel 4 winds up or unwinds a length of vulcanized tube 5 which corresponds to the distance of movement of the trolley 6, the rollers 68, 52 supporting the core 3 by virtue of a relative upward movement with respect to the supports 51, 70 and the pantographs 15 being lowered when the trolley 6 approaches them and raised again once it has passed over them.

The vulcanization, and also the joining of the two sections 5, 82, is then carried out during which the sleeves 60 are inflated and come into contact with the outer surfaces of the sections of tube 82 and 5 to ensure the vapor-tight sealing of the vulcanizer 2. Upon completion of this operation, the trolley 6 returns the core 3 covered by the vulcanized tube 5 to its initial position in the wrapping machine 1, wherein the bandage is removed from the tube 5 by means of the reel carried by the rotary bush 23 of the moving trolley 6.

The core 3 is then re-inserted in the vulcanizer 2 and the vulcanized tube 5 is separated by blowing air into the small tube 41 in the core 3 (FIG. 8) and constricting the tube 5 by means of the device 18. The air works its way between the outer surface of the core 3 and the inner surface of the tube 5 to separate them, and also acts on the base of the end portion of the core 3 which is thrust out of the vulcanizer 2 towards the wrapping machine 1. This thrust is adjusted so that the core is positioned in the wrapping machine 1 again, as at the start of the cycle, with the raw end 83 of the second section, which remained outside the vulcanizer 2, fitted over its end portion 80.

This series of steps can then be repeated cyclically until the tube 5 has reached the required length, using as the first section of tube at any time the entire portion of tube produced up to that time. Flexible tubes of any length, having constant mechanical characteristics throughout their length, can thus be produced.

Naturally, in order to avoid the dead times of the individual pieces of equipment resulting from the use of apparatus and a method of the type just described, a different installation arrangement may be considered. For example, a single trolley may be used to serve two sets of apparatus of the type described, depositing the strips on the core of one while vulcanization is effected in the other.

Figure 10A:
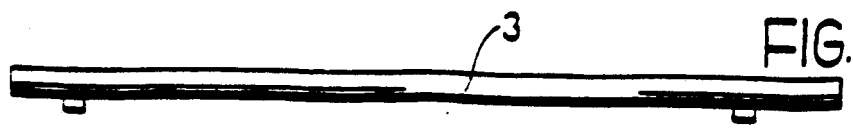
FIGS. 10a to 10i show schematically some stages of another method according to the invention.
Figure 10B:
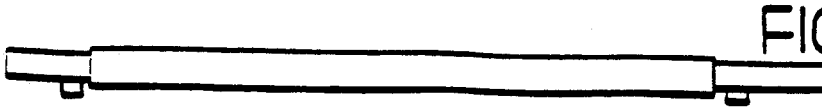
Figure 10C:
Figure 10D:
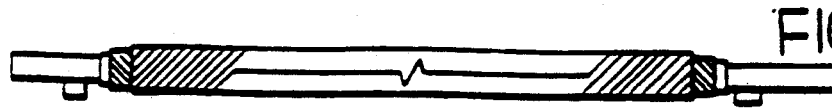
Figure 10E:
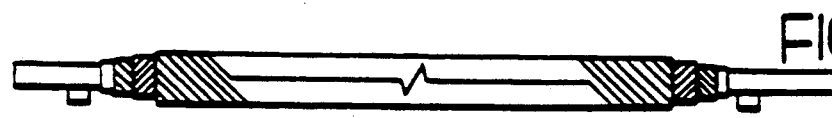
Figure 10F:
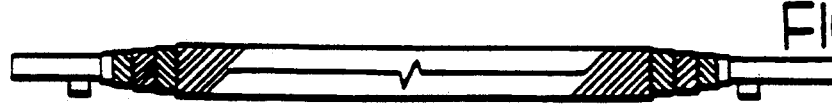
Figure 10G:
Figure 10H:
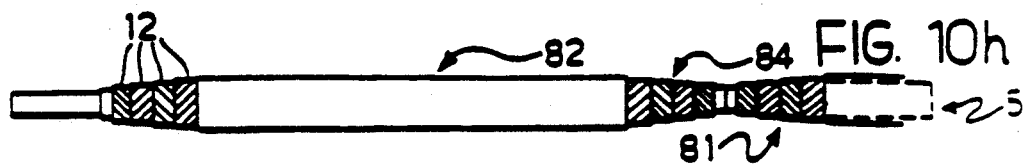

In a variant of the method of the invention, the various strips 12 of rubber may be deposited on a core 3 (FIGS. 10a to 10g) by a conventional wrapping machine (not illustrated) with a rotary core and a reel-carrying trolley which moves parallel to and beside it to form a second section 82 of tube. A raw end 81 of a first already-vulcanized tube section 5 (FIG. 10h) is then fitted onto an end portion 80 of the core which is left free. The two sections 5, 82 are thus a short distance apart, with their respective stepped layers 12 facing each other. Connecting strips 85 with characteristics substantially similar to each of the pairs of strips of the two sections 5, 82 are then applied manually (FIGS. 11a to 11i) between each pair. If necessary, bandaging may be carried out for the purposes of compaction after the deposition of each connecting strip 85, with subsequent unbandaging before the deposition of the next connecting strip 85.

Figure 10I:
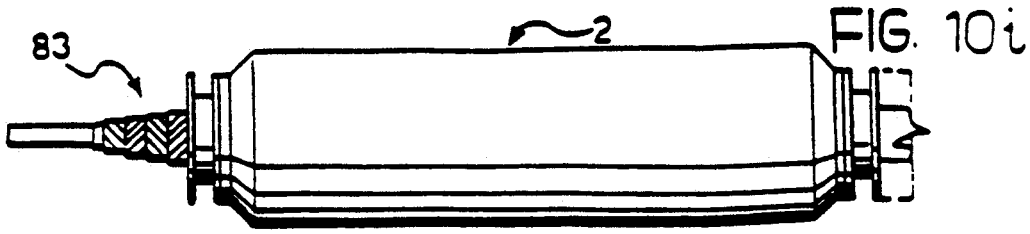
Figure 11A:
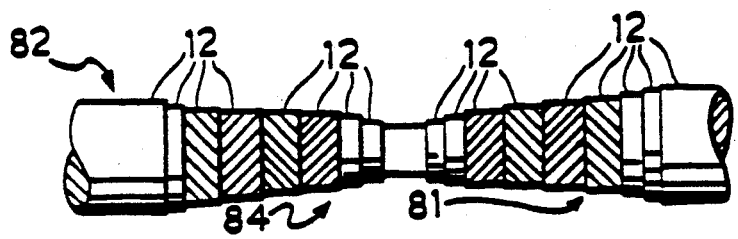
FIGS. 11a to 11i show another method for joining sections of tube according to the invention.
Figure 11B:
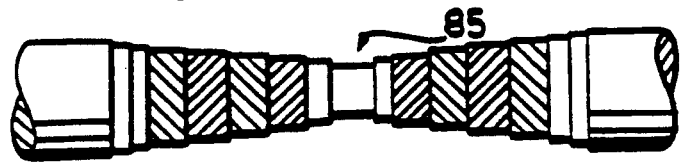
Figure 11C:
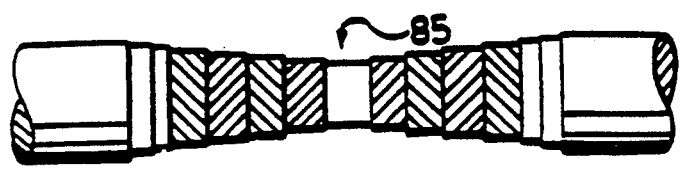
Figure 11D:
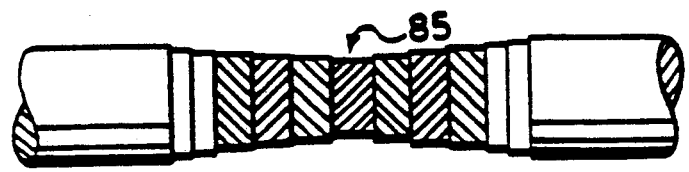
Figure 11E:
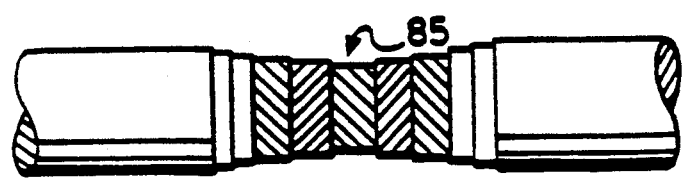
Figure 11F:
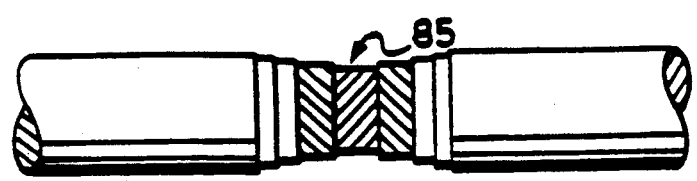
Figure 11G:
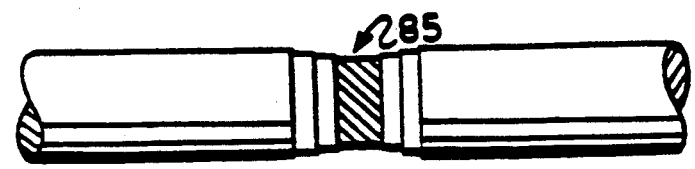
Figure 11H:
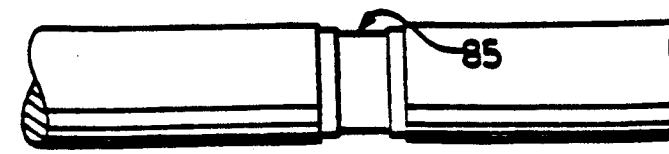
Figure 11I:
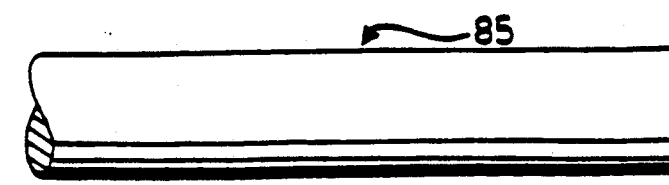

The core 3 thus covered is then inserted (FIG. 10i) into a vulcanizer 2 provided with sealing means as described above, the end 83 of the second section 82 opposite the end 84 adjacent the first section being left outside.

After vulcanization, the core 3 is separated completely from the vulcanized tube 5 by pneumatic means similar to those described above. In this case, the cycle of steps can also be repeated cyclically until the tube has reached the required length, using as the first section 5 of the tube at any time, the entire portion of tube produced up to that time.

While the invention has been particularly shown and described with reference to preferred embodiments thereof, it will be understood by those in the art that the foregoing and other changes in form and details may be made therein without departing from the spirit and scope of the invention.

We claim:

1. A method of producing flexible tubes of desired length from several superposed strips of rubber and/or fiber-reinforced rubber comprising the steps of:

fitting an unvulcanized end of a previously-wrapped first section of tube onto a lateral surface of an end portion of an elongate cylindrical core leaving a remaining portion of the lateral surface of the core uncovered;

covering said remaining portion of the core with a plurality of superposed strips of rubber so as to form, as an extension of the first section, a second section of tube having a first end adjacent the first section, an intermediate portion and a second end opposite the first end;

inserting into a vulcanizer a portion of the core covered by the unvulcanized end of the first section, the first end and the intermediate portion of the second section leaving outside the vulcanizer a portion of the core covered by the second end of the second section;

vulcanizing the unvulcanized end of the first section, the first end and the intermediate portion of the second section inserted in the vulcanizer so as to join the first and second sections to form a vulcanized portion of tube;

separating the vulcanized portion of tube from the core by blowing air into the core so that the air passes through holes formed in the surface of the core and works its way between the outer surface of the core and the inner surface of the tube to separate them;

expelling the core from the vulcanizer until the second end of the second section of tube is fitted onto the lateral surface of the end portion of the core with the vulcanized portion of the tube remaining inside the vulcanizer; and repeating the above steps until the tube has reached the desired length using as the first section of tube at any time the entire portion of the tube produced up to that time.

2. A method according to claim 1, wherein the expelling of the core from the vulcanizer is accomplished by constricting the tube at a point downstream of the vulcanizer and blowing air between the end portion of the core and the constricted point to provide a thrusting action against the core.

3. Apparatus for producing flexible tubes comprising:

a wrapping machine for depositing strips around an elongated cylindrical core and a vulcanizer arranged in series with said wrapping machine on a common axis;

said wrapping machine including a trolley which is provided with a motor for moving the trolley on rails, said trolley having a through hole for the passage of the core in correspondence with the common axis and at least one head which rotates about the axis and carries at least one reel bearing the strips to be deposited; and said vulcanizer having holes in its ends in correspondence with the common axis, propulsion means for moving the core along said common axis into said vulcanizer, and means for supporting the moving core being provided wherein the vulcanizer has, in proximity to its ends, means for sealing against the core covered by the strips which is introduced into the vulcanizer and means for expelling the core out of the vulcanizer toward the wrapping machine including at least a through hole formed in the core surface and means for connecting the hole to air blowing means.

4. Apparatus according to claim 3, wherein the means for supporting the core comprise a plurality of devices, each constituted by at least one support and a roller rotatable about an axis perpendicular to the core, the supports and/or the rollers being provided with motor means which enable their movement in a plane perpendicular to the core so that they can be raised and lowered relative to each other when the core stops or starts moving respectively, whereby the supports support the core when it is stationary and the rollers support the core during its movement.

5. Apparatus according to claim 4, wherein each device consisting of a support and a roller is supported in the wrapping machine by a pantagraph which is located in a trench between the rails and which is movable between a withdrawn position in which it does not interfere with the movement of the trolley and an extended position for supporting the core.

6. Apparatus according to claim 3, wherein the means for sealing the vulcanizer comprise a toroidal inflatable sleeve which is arranged around the hole in each end of the vulcanizer and, once inflated, comes into contact with a circumferential surface of the outermost of the strips covering the core so as to ensure the sealing of the vulcanizer.

7. Apparatus according to claim 3, wherein the trolley includes at least one pair of controlled velocity conveyor belts for supporting the core.

8. Apparatus according to claim 7, wherein the conveyor belts are driven by the motor which causes movement of the trolley.

* * * * *